UNITED STATES PATENT OFFICE.

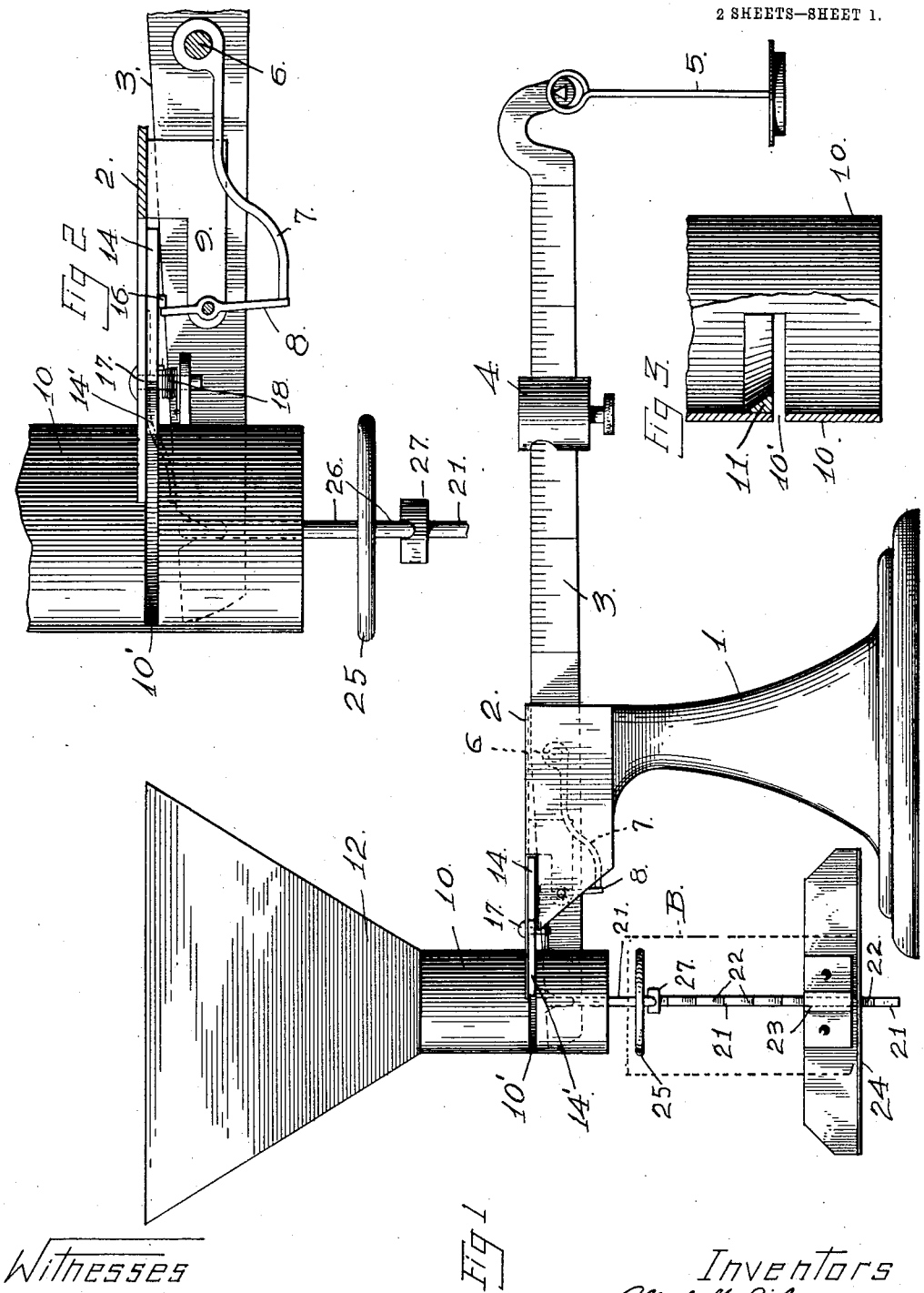

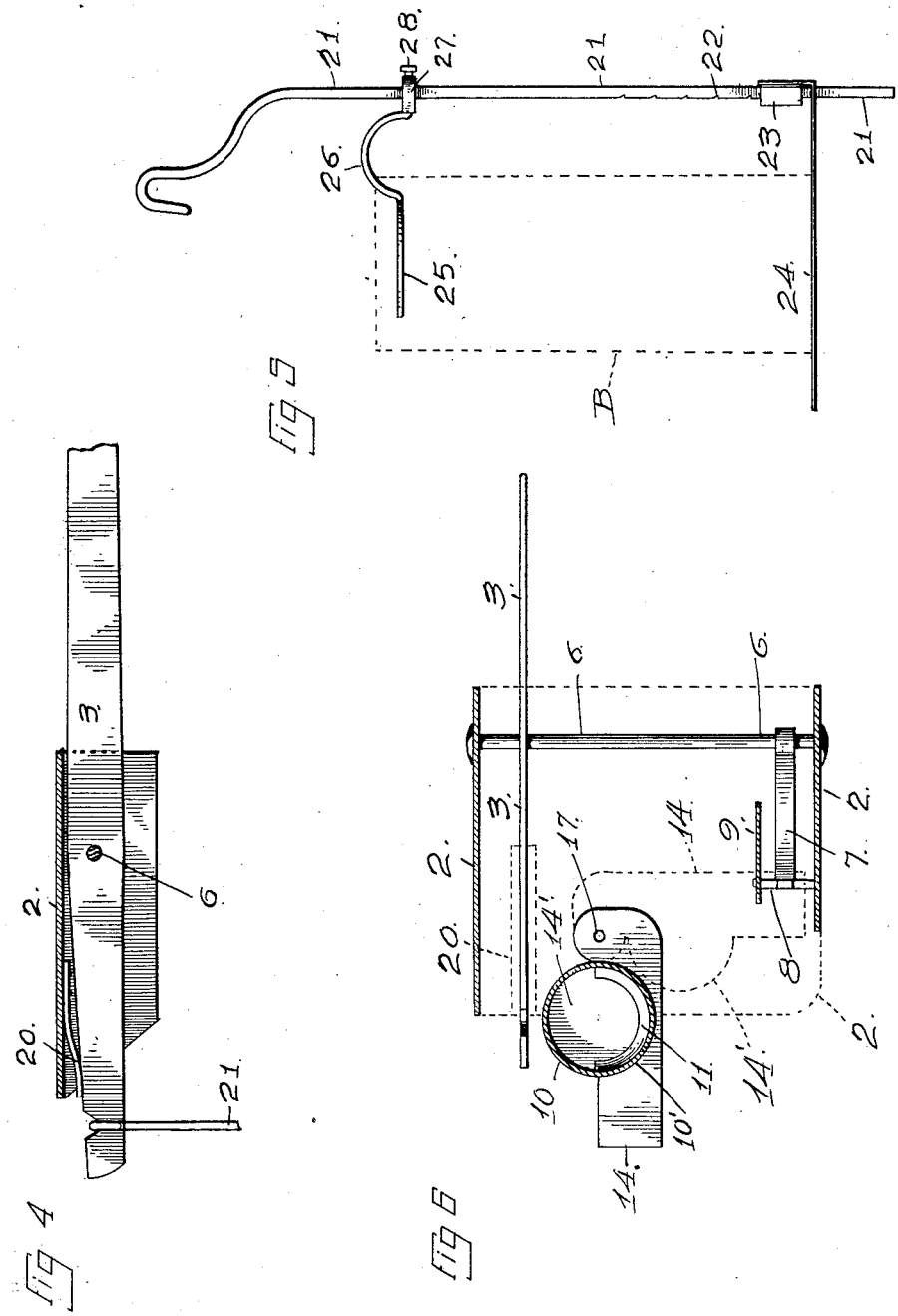

ALBERT M. RICH AND JOHN P. JOHNSON, OF BERKELEY, CALIFORNIA.

AUTOMATIC SCALE.

1,087,685.   Specification of Letters Patent.   Patented Feb. 17, 1914.

Application filed April 17, 1913. Serial No. 761,849.

*To all whom it may concern:*

Be it known that we, ALBERT M. RICH and JOHN P. JOHNSON, citizens of the United States, residing in the city of Berkeley, county of Alameda, and State of California, have invented a new and useful Improvement in Automatic Scales, of which the following is a specification.

Our invention relates to automatic scales wherein a stationary hopper is employed for the purpose of delivering the commodity to be weighed to a receptacle upon the scales and wherein an automatic device is adapted to cut off the supply from the hopper when the desired amount of the commodity has been delivered, and the objects of our invention are first, to provide a scale having a hopper from which the commodity to be weighed may be dispensed into a receptacle on the scale pan, second, means for maintaining the receptacle in an upright position directly under the hopper, third, an adjustable scale pan that may be raised or lowered to suit the height of the receptacle thereon, fourth, to provide means that will automatically cut off the supply of the commodity flowing from the hopper into the receptacle when the desired amount has been obtained, fifth, means for preventing the commodity from escaping through the slot in the lower portion of the hopper, and sixth, to provide means for balancing the beam of the scale just before the amount of the commodity desired has been delivered to the receptacle upon the pan so that the amount of the commodity between the automatic cut off and the receptacle at the time of the cut off will make up the balance of the full weight instead of an overweight.

We accomplish these several features by means of the device illustrated in the drawings forming a part of the present specification, wherein like numerals of reference designate similar parts throughout the said specification and drawings and in which—

Figure 1 is a side elevation of a beam scale disclosing our device attached thereto, the receptacle being indicated in dotted lines. Fig. 2 is an enlarged broken view disclosing the manner in which the spring controlled gate is retained in position while the commodity is flowing from the hopper to the receptacle. Fig. 3 is a broken, detailed sectional view of the lower portion of the delivery tube disclosing the manner in which the upper edge of the slot therein is provided with a hood provided for the purpose of deflecting the commodity away from the slot and also for the purpose of scraping the commodity from the gate when the same is being opened. Fig. 4 is a broken detail view of the pan end of the beam disclosing the compensating spring. Fig. 5 is a side elevation of the scale pan and the receptacle retainer and the means for supporting the same, the receptacle being indicated in dotted lines. Fig. 6 is a sectional plan view of the automatic cut off showing the manner in which the delivery tube is closed, the dotted lines indicating the open position in which the gate is retained by means of a lever secured to the beam.

In weighing commodities of different classes, such as sugar, rice, flour and the like which are generally weighed in paper bags resting upon the scale pan, it has been found rather difficult to maintain the paper bag in an upright position upon the scale pan, also, in case of considerable over weight it is rather difficult to remove some of the contents, owing to the flimsy construction of the receptacle, without spilling or wasting some of the said contents. In order to overcome these undesirable features of weighing loose commodities, we have provided a scale having a hopper into which the commodity to be weighed is placed, and from which it flows, through a delivery tube into a receptacle on the scale pan. The receptacle, generally a paper bag, is maintained in an upright position directly under the tube of the hopper by means of a retaining ring.

Substantially our invention consists in a suitable base 1 having a table 2 to which is pivotally secured the horizontal beam 3 having the usual graduations and a set weight 4 thereon. A hanger 5 for the support of additional weights when large quantities are to be weighed, is pivotally suspended from the outer end of the beam 3 in the usual manner.

The beam 3 is pivotally secured to the depending sides of the table 2 by means of the horizontal shaft 6. An arm 7, rigidly secured near the opposite end of the shaft 6 and adjacent to the short end of the beam 3, is adapted to engage and retain the lower end of a pivoted latch 8 against the pressure of a spring controlled gate 14 which is pivotally secured to the under side of the table 2 at 17, and which rests against the upper end of the said latch 8. Also secured to the table 2 is a delivery tube 10 having a slot 10' therein, the upper inner edge of the said slot being hooded as at 11, and a hopper 12 secured to the top thereof.

The latch 8 is pivotally secured between one of the depending sides of the table 2 and an arm 9 secured to the under side thereof. The upper end of the latch 8 engages a lug 16 on the under side of the gate 14. The gate 14 is provided with a semicircular portion 14' which is adapted to enter the slot 10' of the delivery tube 10 and close the said tube as illustrated in Fig. 6 of the drawings. The gate 14 is normally held in this position by means of the spring 18 which is coiled around the pivot 17.

A flat compensating spring 20 is secured to the under side of the table 2 and directly over the inner end of the beam 3 upon which one end of the said spring 20 rests.

A depending stem 21 is freely suspended from the short end of the beam 3 and is provided with notches 22. The sleeve 23 of the scale pan 24 engages the stem 21 and is slidable thereon. The pan 24 is held in position by the inner edge thereof which engages one of the notches 22 in the stem 21. In order to move the pan 24 up or down for the accommodation of receptacles of various sizes it is only necessary to lift the outer end of the pan 24 until the inner edge thereof is released from the notch 22 in which it rests. The size of the sleeve 23 is sufficient to permit such movement.

A retaining ring 25 is secured by means of a curved or arch connection 26 to the collar 27 which engages the stem 21. The collar 27 is provided with a thumb screw 28 which is adapted to secure the said collar 27 in any position on the stem 21. The ring 25 is adapted to rest slightly below and within the top of the receptacle or paper bag B and thus retain the said bag or receptacle in an upright position and directly below the delivery tube 10.

The operation is as follows: The receptacle B is placed on the pan 24, the said pan being adjusted as hereinbefore described to accommodate the height of the said receptacle. The ring 25 is adjusted so as to fit inside of and slightly below the top of the receptacle B. The gate 14 is turned against the tension of the spring 18 on the pivot 17 to the position indicated in dotted lines in Fig. 6 of the drawings. The latch 8 will swing on its pivot and allow the passage of the lug 16 on the bottom of the gate 14. As the tension of the spring 18 has a tendency to return the gate 14 to a closed position, the lug 16 on the bottom of the said gate 14 will engage the upper end of the latch 8 and tend to move the same on its pivot. This tension will cause the lower end of the latch 8 to be held against the end of the arm 7 and will effectively prevent the closing of the gate 14. The commodity to be weighed is poured into the hopper 12 and flows from thence through the delivery tube 10 and the ring 25 into the receptacle B. As the commodity flows through the delivery tube 10 it is deflected from the slot 10' by means of the hood 11 secured to the top edge thereof. In this manner the spilling and waste of the commodity being weighed is prevented. We will assume that the set weight 4 has been set to weigh one pound. It is evident that when one pound of commodity has been delivered into the receptacle B that the beam 3 will be lowered at the pan end, consequently lowering the end of the arm 7 and releasing the latch 8 and the gate 14, the latter being instantly closed by the action of the spring 18. This will of course, shut off the delivery of the commodity to the receptacle. But, inasmuch as it takes one pound to balance the beam 3 when the weight 4 thereon is set for that amount, it is evident that there must be one full pound actually on the pan 24 before the beam 3 will be tipped and the gate 14 closed. Then the amount of the commodity that is falling between the gate 14 and the receptacle B at the time that the said gate 14 is closed will continue to fall into the receptacle and will be in excess of one pound. In order to compensate for this overweight, we have provided the compensating spring 20 which is adapted to exert a tension on the short end of the beam, said tension being approximately equal to the weight of the amount of the commodity which would be falling between the gate 14 and the receptacle B at the time that the said gate 14 is closed. Consequently, the beam 3 will be tipped by the spring 20, and the gate 14 closed, just previous to the time that one pound has been delivered into the pan but not before one pound has passed the gate 14 in the delivery tube 10.

Having thus described our invention, what we claim as new and desire to secure by Letters Patent is—

1. In an automatic scale, the combination of a suitable frame; a delivery tube rigidly secured to the frame and having a horizontal semi-circular slot therein; a hopper secured to the upper end of the delivery tube; a spring controlled gate having a semi-circular projection on the edge thereof adapted to enter the semi-circular slot and close the delivery tube; a latch pivotally secured to the frame and adapted to engage and retain the gate away from the delivery tube; a horizontal shaft rotatably mounted within the frame; a beam secured to one end of the shaft; a bent lever secured near the other end of the shaft and adjacent to the short end of the beam and adapted to engage the lower end of the latch when the short end of the beam is elevated and to release the said latch when the short end of the beam is lowered; a pan freely suspended from the short end of the beam and adapted to retain a receptacle in an upright position and directly below the delivery tube; and means adapted to lower the short end of the beam when the weight on the pan is nearly equal to a set weight on the long end of the beam.

2. In an automatic scale, the combination of a suitable frame; a vertical delivery tube rigidly secured to the frame and having a horizontal semi-circular hooded slot therein; a hopper secured to the upper portion of the delivery tube; a horizontal spring controlled gate pivotally secured to the frame and having a semi-circular portion adapted to enter the slot in the delivery tube and close the said tube; a lug on the under side of the gate; a latch pivotally secured to the frame and adapted to engage the lug on the under side of the gate and to retain the said gate away from the delivery tube; a horizontal shaft rotatably mounted within the frame; a scale beam secured to the shaft near one end thereof; an arm secured to the shaft adjacent to the short end of the beam and adapted to engage the lower end of the latch and retain the gate away from the delivery tube when the short end of the beam is elevated and to release the latch and the gate for the purpose of closing the delivery tube when the short end of the beam is lowered; a bent stem freely suspended from the short end of the beam; a suitable pan vertically movable on the bent stem; means secured to the stem for retaining a paper bag on the pan in an upright position; and a spring secured to the frame and having a tension on the short end of the beam for the purpose of lowering the said short end when the weight on the pan is very nearly equal to a set weight on the long end of the beam.

3. In an automatic scale, the combination of a suitable frame; a vertical delivery tube rigidly secured to the frame and having a horizontal semi-circular hooded slot therein; a hopper secured to the upper end of the delivery tube; a horizontal spring controlled gate pivotally secured to the frame and having a semi-circular projection adapted to enter the horizontal slot of the delivery tube for the purpose of closing the said tube; a lug on the gate; a latch pivotally secured to the frame and adapted to engage the lug on the gate for the purpose of retaining the said gate away from the delivery tube; a horizontal shaft rotatably mounted within the frame; a scale beam secured to the shaft near one end thereof; a bent lever secured near the other end of the shaft adjacent to the short end of the beam and adapted to engage the lower end of the latch when the short end of the beam is elevated and to release the said latch and the gate which the latch retains when the said short end of the beam is lowered; a bent stem freely suspended from the short end of the beam; a scale pan vertically adjustable on the bent stem; a collar vertically adjustable on the stem; a ring having an arched connection with the collar on the stem; and a spring secured to the frame and adapted to lower the short end of the beam when the weight suspended therefrom is nearly equal to a set weight on the long end of the beam.

In witness whereof we hereunto set our signatures in the presence of two subscribing witnesses.

ALBERT M. RICH.
JOHN P. JOHNSON.

Witnesses:
ARTHUR WHITE,
JAMES F. McCUE.